United States Patent
Adiletta

(10) Patent No.: US 10,507,546 B2
(45) Date of Patent: Dec. 17, 2019

(54) LASER CUTTING DEBRIS COLLECTION SYSTEM

(71) Applicant: Xerox Corporation, Norwalk, CT (US)

(72) Inventor: Mark A. Adiletta, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 331 days.

(21) Appl. No.: 15/460,352

(22) Filed: Mar. 16, 2017

(65) Prior Publication Data

US 2018/0264595 A1 Sep. 20, 2018

(51) Int. Cl.
| | |
|---|---|
| *B23K 26/142* | (2014.01) |
| *B23K 26/38* | (2014.01) |
| *B23K 26/144* | (2014.01) |
| *B01D 46/00* | (2006.01) |
| *B41J 11/70* | (2006.01) |
| *B23K 26/402* | (2014.01) |
| *B23K 103/16* | (2006.01) |

(52) U.S. Cl.
CPC ............ *B23K 26/142* (2015.10); *B23K 26/38* (2013.01); *B23K 26/402* (2013.01); *B01D 46/0067* (2013.01); *B23K 2103/172* (2018.08); *B41J 11/70* (2013.01)

(58) Field of Classification Search
CPC ........ B23K 26/14; B23K 26/38; B23K 26/40; B01D 46/00; B41J 11/70
USPC .............. 219/121.67–121.72, 121.84, 121.6, 219/121.86
See application file for complete search history.

(56) References Cited

U.S. PATENT DOCUMENTS

| | | | |
|---|---|---|---|
| 1,946,780 A * | 2/1934 | Costello | F42D 1/10 406/138 |
| 2,796,950 A * | 6/1957 | Hersey, Jr. | B01D 46/10 55/287 |
| 3,582,466 A * | 6/1971 | Quirk | B23K 26/0846 162/286 |
| 4,093,422 A | 6/1978 | Hain | |
| 4,659,463 A | 4/1987 | Chandler et al. | |
| 4,964,940 A * | 10/1990 | Auvert | B23K 26/12 118/50.1 |
| 5,190,659 A | 3/1993 | Wang et al. | |
| 5,221,520 A | 6/1993 | Cornwell | |
| 5,305,697 A | 4/1994 | Greene et al. | |

(Continued)

FOREIGN PATENT DOCUMENTS

| | | | | |
|---|---|---|---|---|
| DE | 19825616 A1 * | 12/1999 | | B01D 46/0068 |
| JP | 10118446 A * | 5/1998 | | |
| WO | 2013084173 | 6/2013 | | |

*Primary Examiner* — Samuel M Heinrich
(74) *Attorney, Agent, or Firm* — Gibb & Riley, LLC

(57) ABSTRACT

Apparatuses include a laser cutter positioned within an enclosure that is capable of cutting printed sheets; however, this cutting produces debris made up of airborne dust of the sheet material and marking material. An air duct is capable of drawing an air stream of air and the debris out of the enclosure. A dispenser is positioned within the air duct where the air duct connects to the enclosure. The dispenser is capable of dispensing a dry powder of calcium carbonate into the air stream. The dry powder attaches to the debris. The combination of the dry powder and the debris forms waste, and a filter device (that is connected to the air duct) filters the waste. The filter device is capable of separating the air from the waste, to collect the waste and release the air free of the waste to areas outside the filter device.

20 Claims, 3 Drawing Sheets

(56) References Cited

U.S. PATENT DOCUMENTS

| | | | |
|---|---|---|---|
| 6,191,382 B1 * | 2/2001 | Damikolas | B23K 26/04 |
| | | | 219/121.62 |
| 6,454,141 B1 | 9/2002 | Breen et al. | |
| 6,696,284 B2 | 2/2004 | Haridas et al. | |
| 9,249,031 B2 | 2/2016 | Shaw et al. | |
| 2006/0191426 A1 * | 8/2006 | Timmerman | B26D 5/32 |
| | | | 101/24 |
| 2007/0157940 A1 * | 7/2007 | Mua | A24D 1/025 |
| | | | 131/360 |
| 2011/0266217 A1 | 11/2011 | Kajdasz et al. | |
| 2017/0095829 A1 * | 4/2017 | Hajakian | B05C 1/0826 |

* cited by examiner

LASER CUTTING DEBRIS COLLECTION SYSTEM

BACKGROUND

Systems and methods herein generally relate to laser calefaction printing systems, and more particularly to a laser cutting debris collection system.

High production manufacturing facilities often print many copies of items (such as signs, components of items to be assembled later, etc.) on large bulk substrates (such a plastic sheets, cardboard sheets, metal sheets, etc.); and, after printing, cut such larger printed substrates into the smaller printed individual items. For example, it is common to print multiple signs (e.g., store display signs) on a single larger sheet, and cut the sheet into individual signs. However, cutting processes can produce debris.

One potential advantage of performing laser cutting of such printed substrates over conventional mechanical cutting (e.g., sheering, sawing, slicing, etc.) is that the laser cutting process applies a laser beam to cut the material, and the laser beam operates at very high temperatures, which can melt or combust the debris particles that would normally be produced during mechanical cutting. However, in many situations even laser cutting produces some debris.

For example, printed substrates of paper can contain clay, as well as toner, silicone fuser oil, and plastic if the paper is coated; and when the laser hits all of those compounds it produces a sticky, gummy, clay-like aerosol that is not only very difficult to capture, but can also be a hazard due to its deflagration constant. Thus, when laser cutting printed sheets, the marking materials (toner, inks, etc.) applied during printing, combined with the cut substrate material can form airborne particles that are very gummy or very sticky (e.g., particles that have a high adhesion measure or coefficient), and this can make it difficult to remove and dispose of such sticky particles.

SUMMARY

Various apparatuses herein can include (among other components) a laser cutter and potentially a printer, where at least the laser cutter is positioned within an enclosure. The printer is capable of printing marking material on sheets to create printed sheets, and the laser cutter is positioned to receive the printed sheets from the printer. The laser cutter is capable of cutting the printed sheets into individual items (such as printed signs); however, this cutting produces debris. Therefore, an air duct is connected to the enclosure. The air duct is capable of drawing an air stream (made up of air and the debris) out of the enclosure.

More specifically, this debris is made up of airborne dust particles of substrate material (from the sheets) and the marking material (used during printing); and the debris is produced by cutting the printed sheets. The debris is very sticky and can easily clog up the air duct (e.g., the debris has a first adhesive measure capable of adhering to itself and to the air duct).

Therefore, a dispenser is positioned within the air duct where the air duct connects to the enclosure. The dispenser is capable of dispensing a dry powder of calcium carbonate (potentially only calcium carbonate, but possibly a mixture) into the air stream flowing within the air duct as the debris is being drawn out of the enclosure. The dry powder is capable of attaching to the debris in the air stream as the debris is being drawn out of the enclosure, and the combination of the dry powder and the debris forms what is referred to herein as "waste." Contrary to the sticky debris, this waste is not as sticky and will not easily clog up the air duct (e.g., the waste has a second adhesive measure that is substantially incapable of adhering to itself and to the air duct, and the first adhesive measure is higher than the second adhesive measure). The dispenser can use any device to dispense the dry powder, including a venturi device that dispenses the dry powder using vacuum forces caused by the air stream, a pressurized nozzle, etc.

In order to capture this waste, a filter device is positioned outside the enclosure, and is connected to the air duct. The filter device comprises an exhaust fan creating the air stream in the air duct. The filter device is capable of receiving the air stream and separating the air from the waste, to collect the waste and release the air free of the waste to areas outside the filter device. For example, the filter device includes a filter having openings smaller than particles of the waste to permit the air stream to pass, but prevent the particles of the waste from passing. Also, the filter device has a reverse cycle capable of cleaning the filter. Additionally, the dispenser is capable of dispensing the dry powder before the debris enters the air duct to apply the dry powder as a coating on the filter of the filter device.

These apparatuses also include a particle transport device connected to the filter device. The particle transport device is capable of moving the waste from the filter device to a disposal location. The particle transport device includes some form of conveyor (e.g., belt, auger, chute, etc.).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, when laser cutting printed sheets, the marking materials (toner, inks, etc.) applied during printing, combined with the cut substrate material can form airborne ultra-small particles (<100 microns in size) that are very gummy or very sticky (e.g., particles that have a high adhesion measure or coefficient), and this can make it difficult to remove and dispose of such sticky particles.

More specifically, a technical challenge exists when laser cutting printed sheets because the deflagration constant of the debris produced may be greater than zero (e.g., may be explosive). There are many federal regulatory requirements that exist to make systems explosion proof, or the addition of an inert material needs could be used to remove the deflagration constant. Further, systems should meet Occupational Safety and Health Administration (OSHA) standards for particle emissions, as well as to be able to be operated remotely.

Thus, one of the technical issues addressed by devices disclosed herein is properly selecting an inert material that both reduces the deflagration constant, while at the same time prevents the laser particulate emissions from sticking to the duct walls and the filter media. For example, it is very useful to utilize an inert material that would not stick to, for example, a glazed oleophobic filter. An additional technical challenge exists because the laser cutting chamber may need to operate in a vacuum or near vacuum, and a digihelic sensor can be tied into the laser control operating system to insure that a sufficient airflow is present. If the air flow sensed by the digihelic sensor drops below a certain level, the system will automatically turn off, which is undesirable and can result in costly, lengthy delays associated with filter and duct cleaning.

The devices described herein solve such technical challenges and provide a laser chamber that cuts at high speed without creating a deflagration cloud in the chamber. With the devices herein, calcium carbonate ($CaCO_3$) is used as the inert material to reduce the deflagration constant, but rather than using calcium carbonate in solution or as a filter coating, these devices injected the calcium carbonate into the ductwork at the very beginning of the duct (e.g., the location where the ductwork attaches to the laser chamber). This prevents the debris from sticking to the ductwork or the filters. Additionally, a controlled air backpulse manifold is used to easily and constantly clear the filter of the debris. Further, the control systems herein promote efficient remote monitoring.

Figure 1:
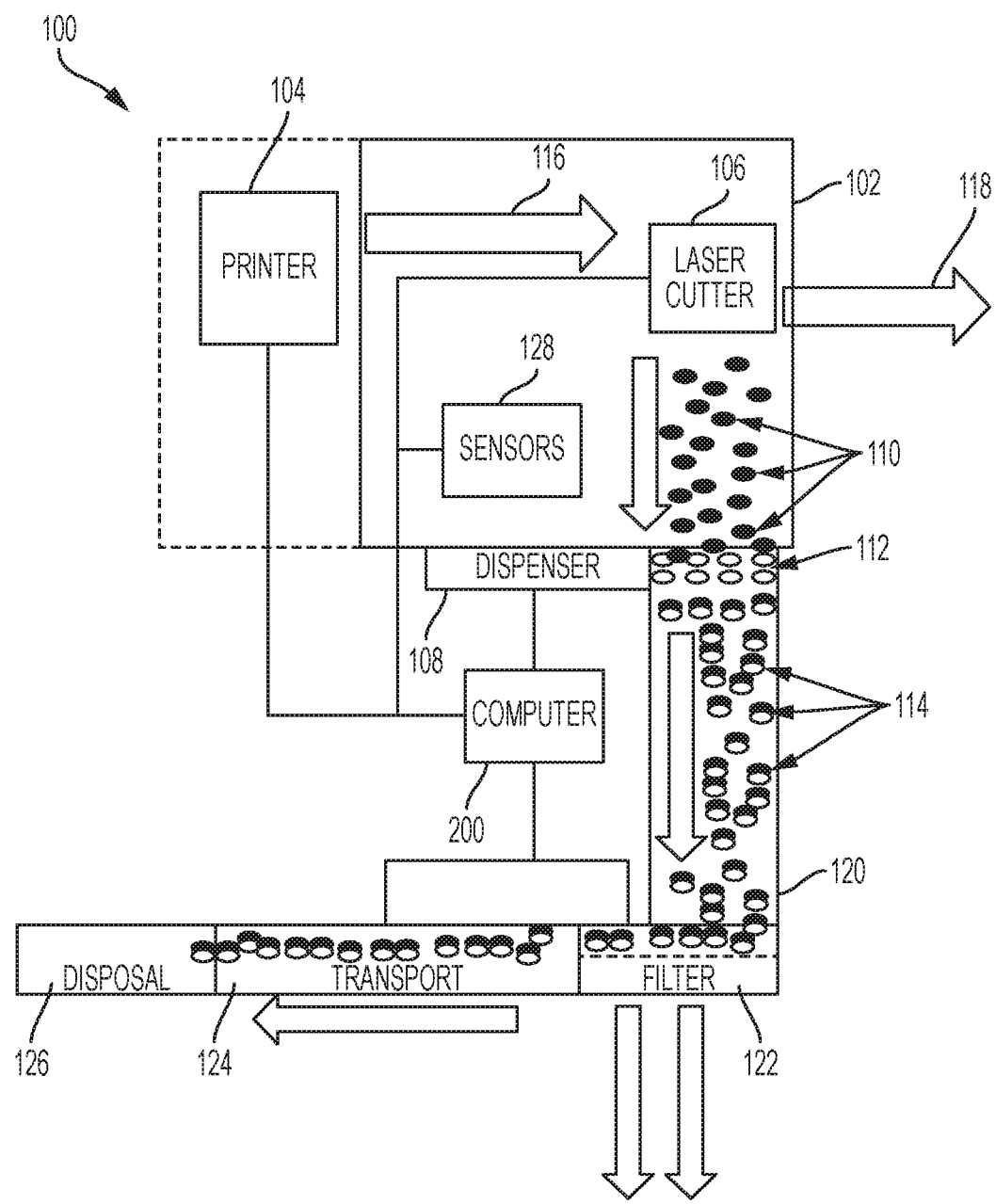
FIG. 1 is a schematic diagram illustrating systems/devices herein.

As shown in FIG. 1, various apparatuses herein can include (among other components) a laser cutter 106 and potentially a printer 104, where at least the laser cutter 106 is positioned within an enclosure 102. Therefore, as shown in FIG. 1, the laser chamber enclosure 102 can surround just the laser cutter 106 or (as shown by the dashed lines) can also surround the printer 104 if laser calefaction printing occurs. Further, various sensors 128 (e.g., a digihelic sensor, optical debris sensors, temperature sensors, pressure sensors, etc.) are positioned within the enclosure and are capable of detecting the vacuum parameters in the enclosure.

The printer 104 is capable of printing marking material on sheets of virtually any material to create printed sheets 116, and the laser cutter 106 is positioned to receive the printed sheets 116 from the printer 104. The laser cutter 106 is capable of cutting the printed sheets 116 into individual items 118 (such as printed signs, printed components); however, this cutting produces debris (shown as black dots 110 in the drawings). Therefore, an air duct 120 is connected to the enclosure 102. The air duct 120 is capable of drawing an air stream (made up of air and the debris 110) out of the enclosure 102 to create any vacuum condition useful for laser cutting operations.

More specifically, this debris 110 is made up of airborne dust particles of substrate material (from the sheets 116) combined with the marking material (used during printing); and the debris 110 is produced during cutting of the printed sheets 116. The debris 110 is very sticky and can easily clog up the air duct 120 (e.g., the debris 110 has a first adhesive measure capable of adhering to itself and to the air duct 120).

Therefore, a dispenser 108 (dispensing device) is positioned within the air duct 120 at the beginning of the air duct 120 where the air duct 120 connects to the enclosure 102. The dispenser 108 is capable of dispensing a dry powder (shown as white dots 112 in the drawings) of calcium carbonate (potentially only calcium carbonate, or a mixture containing calcium carbonate) into the air stream flowing within the air duct 120 at a precisely controlled ratio to the debris 110 as it is being drawn out of the enclosure 102. Food grade calcium carbonate can be used in order to keep locations safer for equipment operators.

The dry powder 112 is capable of attaching to the debris 110 in the air stream as the debris 110 is being drawn out of the enclosure 102, and the combination of the dry powder 112 and the debris 110 forms what is referred to herein as "waste," which is illustrated as white and black dots 114 (e.g., items 110 and 112 combined) in the drawings. Contrary to the sticky debris 110, this waste 114 is not as sticky and will not easily clog up the air duct 120 (e.g., the waste 114 has a second adhesive measure incapable of adhering (or at least being less capable of adhering, relative to the sticky debris 110) to itself and to the air duct 120. Thus, the stickiness of the debris 110 (the first adhesive measure) is higher than the stickiness of the waste 114 (the second adhesive measure) by a factor of, for example, 2 times, 5 times, 10 times, 50 times, 100 times, etc.

In order to dispose of the waste 114, a filter device 122 is positioned outside the enclosure 102, and is connected to the air duct 120. The waste 114 flows in the duct to the filter device 122. Prior to receiving any of the waste 114, the filter device 122 is capable of receiving the dry power 112 to precoat the filter device as an initial step in achieving a second adhesive measure on the filter media itself. The filter device 122 is capable of receiving the air stream and separating the air from the waste 114, to collect the waste 114 and release the air stream free of the waste 114 to areas outside the filter device 122. FIG. 1 also illustrates a particle transport device 124 connected to the filter device 122. The particle transport device is capable of moving the waste 114 from the filter device 122 to a disposal location 126, such as a dumpster, recycler, or other waste collection item.

A computer 200 (also shown in FIG. 4, and discussed in greater detail below) is directly or indirectly electrically connected to all the above elements; and controls and coordinates the operation of all such elements. Further, the computer 200 allows remote monitoring and control of all such components.

Figure 2:
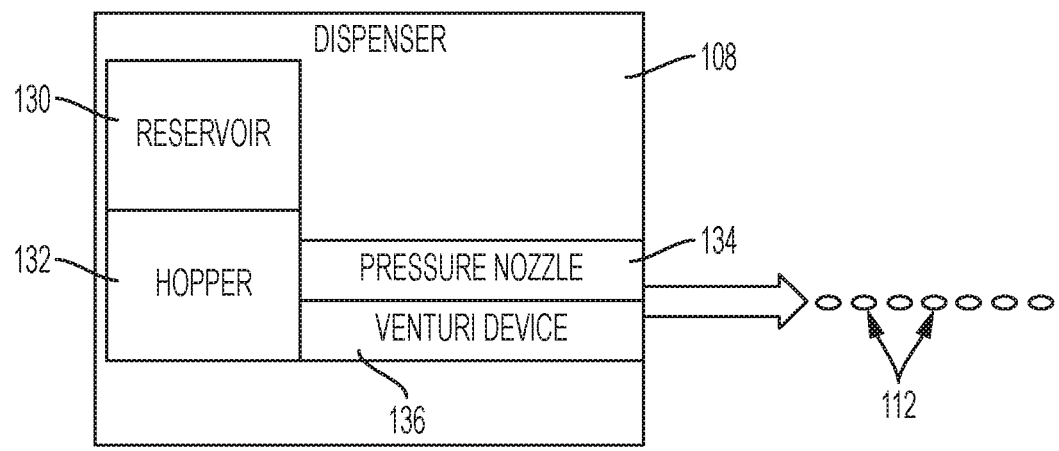
FIGS. 2 and 3 are schematic diagrams illustrating different aspects of the systems/devices shown in FIG. 1.

As shown in FIG. 2, the dispenser 108 can include a reservoir 130 of the dry powder 112, and a hopper 132 that supplies the dry powder 112 to one or more dispensing devices. As also shown in FIG. 2, the dispensing device 108 can include any device that dispenses dry powder 112, including a pressurized nozzle 134 that sprays the dry powder 112 using air pressure, a venturi device 136 that dispenses the dry powder 112 by drawing the dry powder 112 from the hopper 132 using vacuum forces created by the air stream, etc.

The dispenser 108 (under control of the computer 200) can adjust the timing and amount of dry powder 112 dispensed based on many different factors including how much debris sensors detect, how much cutting is being performed, the makeup of the substrate material, how much printing is on the substrate material, etc. Therefore, based on previous empirical testing, the computer 200 can call for more or less dry powder 112 from the dispenser 108 based on the printing being performed by the printer 104, the amount and type of cutting being performed by the laser cutter 102, the material makeup of the substrate, etc., so as to minimize the user of the dry powder 112, yet still achieve sufficient reduction of the debris 110.

Figure 3:
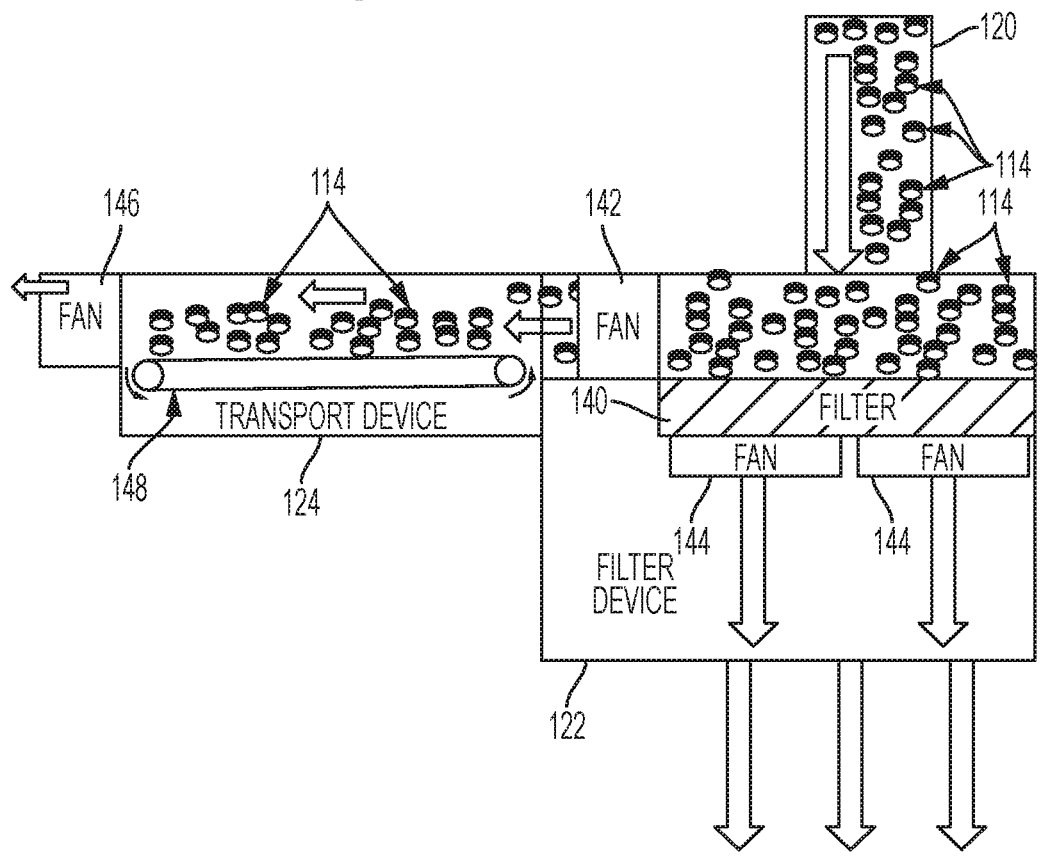

As shown in FIG. 3, the filter device 122 includes at least one filter having openings smaller than particles of the waste 114 to permit the air stream to pass, but prevent the particles of the waste 114 from passing. While any appropriate filter can be used, in one example, oleophobic filters can be used, and such items are made by forming various coating on the surface of a filtration substrate.

As also shown in FIG. 3, the filter device 122 can include one or more exhaust fans 142, 144, 146 that create or add to the air stream in the air duct 120. While any combination or arrangement of fans may be utilized, in this example, fan 142 is used to encourage the waste 114 to move toward the transportation device 124; and fan(s) 144 pull the airstream through the filter 140.

Also, the filter device 122 has a reverse cycle capable of cleaning the filter and supplying the waste 114 from the filter to the particle transport device 124. During this reverse cycle operation, at least one fan 142, 146 continues to drive air out of the filter device 122 toward the transport device 124; however, other fan(s) 144 are reversed to blow air back through the filter 140. This results in air flowing backwards through the filter 140, which causes the waste 114 to be blown off the filter 140, and such waste 114 is then pulled by the forward operating fan(s) 142, 146 away from the filter 140 and out to the transport device 124 (preventing such material removed from the filter 140 from returning into the duct 120). The filter 140 can be cleaned automatically under control of the computer 200 periodically according to a previously established schedule, when air flow is sensed as being reduced below an acceptable level, when load on the fans 144 become too high, when manually called for, etc.

The computer 200 can also perform a pre-coat operation, in which the computer controls 200 the dispenser 108 to dispense the dry powder 112 before the debris 110 enters the air duct 120 (or while the computer 200 stops the laser cutter 106, and no debris 110 is entering the air duct 120); and this operation applies the dry powder 112 as a coating on the filter 140 of the filter device 122. For example, immediately after a used filter 140 is changed for a new filter 140, the new filter 140 can receive a coating of the dry powder 112 by having only the dry powder 112 flow through the air duct 120, and before any debris 110 is created by the laser cutter 106. Alternatively, after each time the filter 140 is cleaned using the reverse cycle operation, the computer can stop the operation of the laser cutter 106, and cause the dispenser 108 to activate, to coat the filter 140 with more dry powder 112 (while no debris 110 is flowing in the air duct 120). The coating of dry powder 112 on the filter 140 increases the effectiveness of the filter 140 by allowing it to capture more of the waste 114 and debris 110 (especially any debris 110 that does not previously combine with the dry powder 112 in the air duct 120).

Because of the relatively lower adhesion measure of the waste 114, the waste 114 does not stick to the inside of the duct 120 and does not stick to the filter 140 (thereby promoting the automated filter cleaning during the reverse cycle operation). Thus, the devices herein dispense calcium carbonate at the very beginning of the duct 120, allowing these structures to immediately reduce the adhesion measure of that debris 110 (e.g., by immediately converting the debris 110 into the less sticky waste 114) before the debris 110 has an opportunity to stick to the duct 120 or filter 140.

The devices herein solve a number of technological problems that existed previously. By using a dry powder, problems associated with liquid agents (e.g., liquid dissolved calcium carbonate) and their accumulation of such agents within the duct and filter system are avoided. Additionally, existing devices that use beds of calcium carbonate or similar coatings on filters suffer from contaminated beds and clogged filters. Such items in existing systems results in clogged ducts, and these items make filter cleaning process much more difficult because the debris sticks to the beds and filters. Therefore, by introducing the calcium carbonate as early as possible into the airstream, the stickiness of the debris 110 is immediately reduced, which solves a substantial technological problem that existed previously, and this reduces or eliminates contaminated ductwork and clogged filters.

As additionally show in FIG. 3, the particle transport device 124 includes some form of conveyor (e.g., belt, auger, chute, etc.); and all variants of such movement devices are generally illustrated by item 148. In addition, the transport device 124 can include one or more additional fans 146 that also encourage the waste 114 to move away from the filter device 122.

Figure 4:
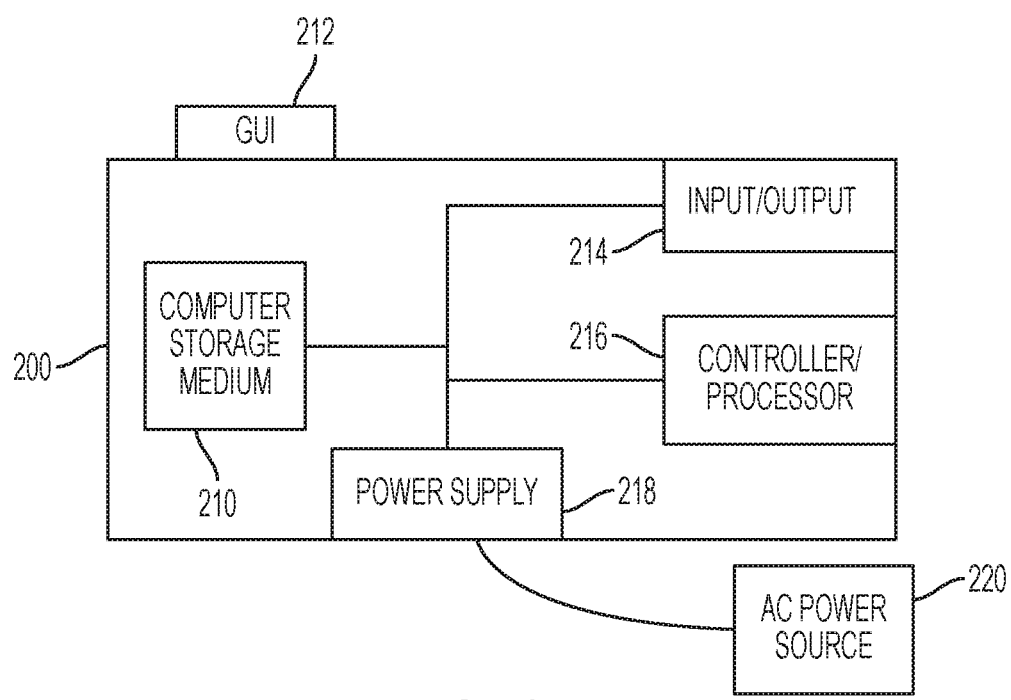
FIG. 4 is a schematic diagram illustrating a computerized device include within devices herein.

FIG. 4 illustrates a computerized device 200, which can be used with systems and methods herein and can comprise, for example, a server, a personal computer, a portable computing device, etc. The computerized device 200 includes a controller/tangible processor 216 and a communications port (input/output) 214 operatively connected to the tangible processor 216 and to a computerized network external to the computerized device 200. Also, the computerized device 200 can include at least one accessory functional component, such as a graphical user interface (GUI) assembly 212. The operator may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc), etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners, laser cutters, and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
    an enclosure;
    a laser cutter positioned within said enclosure, said laser cutter is capable of cutting printed sheets into individual items, and said cutting produces debris;
    an air duct connected to said enclosure, said air duct is capable of drawing an air stream of air and said debris out of said enclosure;
    a dispenser positioned within said air duct where said air duct connects to said enclosure, said dispenser is capable of dispensing a dry powder comprising calcium carbonate into said air stream flowing within said air duct as said debris is being drawn out of said enclosure, said dry powder is capable of attaching to said debris in said air stream as said debris is being drawn out of said enclosure to form waste from a combination of said dry powder and said debris; and
    a filter device connected to said air duct, said filter device is capable of receiving said air stream and separating said air from said waste, to collect said waste and release said air free of said waste to areas outside said filter device.

2. The apparatus according to claim 1, said dispenser comprises at least one of:
    a venturi device dispensing said dry powder using vacuum forces caused by said air stream; and
    a pressurized nozzle.

3. The apparatus according to claim 1, further comprising a sensor within said enclosure capable of detecting the vacuum parameters in said enclosure.

4. The apparatus according to claim 1, said filter device comprises:
    a filter having openings smaller than particles of said waste to permit said air stream to pass and prevent said particles of said waste from passing; and
    a reverse cycle capable of cleaning said filter and supplying said waste from said filter to a particle transport device.

5. The apparatus according to claim 4, said particle transport device comprises a conveyor.

6. The apparatus according to claim 1, said debris has a first adhesive measure capable of adhering to itself and to said air duct, said waste has a second adhesive measure incapable of adhering to itself and to said air duct, and said first adhesive measure is higher than said second adhesive measure.

7. The apparatus according to claim 1, said dispenser is capable of dispensing said dry powder before said debris enters said air duct to apply said dry powder as a coating on said filter device.

8. An apparatus comprising:
    an enclosure;
    a laser cutter positioned within said enclosure, said laser cutter is capable of cutting printed sheets into individual items, and said cutting produces debris comprising an airborne dust of sheet material and marking material;
    an air duct connected to said enclosure, said air duct is capable of drawing an air stream of air and said debris out of said enclosure;
    a dispenser positioned within said air duct where said air duct connects to said enclosure, said dispenser is capable of dispensing a dry powder comprising calcium carbonate into said air stream flowing within said air duct as said debris is being drawn out of said enclosure, said dry powder is capable of attaching to said debris in said air stream as said debris is being drawn out of said enclosure to form waste from a combination of said dry powder and said debris;
    a filter device connected to said air duct, said filter device is capable of receiving said air stream and separating said air from said waste, to collect said waste and release said air free of said waste to areas outside said filter device; and
    a particle transport device connected to said filter device, said particle transport device is capable of moving said waste from said filter device to a disposal location.

9. The apparatus according to claim 8, said dispenser comprises at least one of:
    a venturi device dispensing said dry powder using vacuum forces caused by said air stream; and
    a pressurized nozzle.

10. The apparatus according to claim 8, further comprising a sensor within said enclosure capable of detecting the vacuum parameters in said enclosure.

11. The apparatus according to claim 8, said filter device comprises:
    a filter having openings smaller than particles of said waste to permit said air stream to pass and prevent said particles of said waste from passing; and a reverse cycle capable of cleaning said filter and supplying said waste from said filter to said particle transport device.

12. The apparatus according to claim 8, said particle transport device comprises a conveyor.

13. The apparatus according to claim 8, said debris has a first adhesive measure capable of adhering to itself and to said air duct, said waste has a second adhesive measure incapable of adhering to itself and to said air duct, and said first adhesive measure is higher than said second adhesive measure.

14. The apparatus according to claim 8, said dispenser is capable of dispensing said dry powder before said debris enters said air duct to apply said dry powder as a coating on said filter device.

15. An apparatus comprising:

an enclosure;

a printer positioned within said enclosure, said printer is capable of printing marking material on sheets to create printed sheets;

a laser cutter positioned within said enclosure, said laser cutter is positioned to receive said printed sheets from said printer, said laser cutter is capable of cutting said printed sheets into individual items, and said cutting produces debris comprising an airborne dust of sheet material and said marking material;

an air duct connected to said enclosure, said air duct is capable of drawing an air stream of air and said debris out of said enclosure;

a dispenser positioned within said air duct where said air duct connects to said enclosure, said dispenser is capable of dispensing a dry powder comprising calcium carbonate into said air stream flowing within said air duct as said debris is being drawn out of said enclosure, said dry powder is capable of attaching to said debris in said air stream as said debris is being drawn out of said enclosure to form waste from a combination of said dry powder and said debris;

a filter device positioned outside said enclosure and connected to said air duct, said filter device is capable of receiving said air stream and separating said air from said waste, to collect said waste and release said air free of said waste to areas outside said filter device; and a particle transport device connected to said filter device, said particle transport device is capable of moving said waste from said filter device to a disposal location.

16. The apparatus according to claim 15, said dispenser comprises at least one of:

a venturi device dispensing said dry powder using vacuum forces caused by said air stream; and a pressurized nozzle.

17. The apparatus according to claim 15, further comprising a sensor within said enclosure capable of detecting the vacuum parameters in said enclosure.

18. The apparatus according to claim 15, said filter device comprises:

a filter having openings smaller than particles of said waste to permit said air stream to pass and prevent said particles of said waste from passing; and a reverse cycle capable of cleaning said filter and supplying said waste from said filter to said particle transport device.

19. The apparatus according to claim 15, said particle transport device comprises a conveyor.

20. The apparatus according to claim 15, said debris has a first adhesive measure capable of adhering to itself and to said air duct, said waste has a second adhesive measure incapable of adhering to itself and to said air duct, and said first adhesive measure is higher than said second adhesive measure.

* * * * *